3,170,725
ADJUSTABLE RECLINING AUTOMOBILE REAR SEAT AND HEAD REST THEREFOR
Clarence L. Komorowski, Detroit, Mich., assignor to General Motors Corporation, Detroit, Mich., a corporation of Delaware
Filed Sept. 19, 1961, Ser. No. 139,197
2 Claims. (Cl. 296—63)

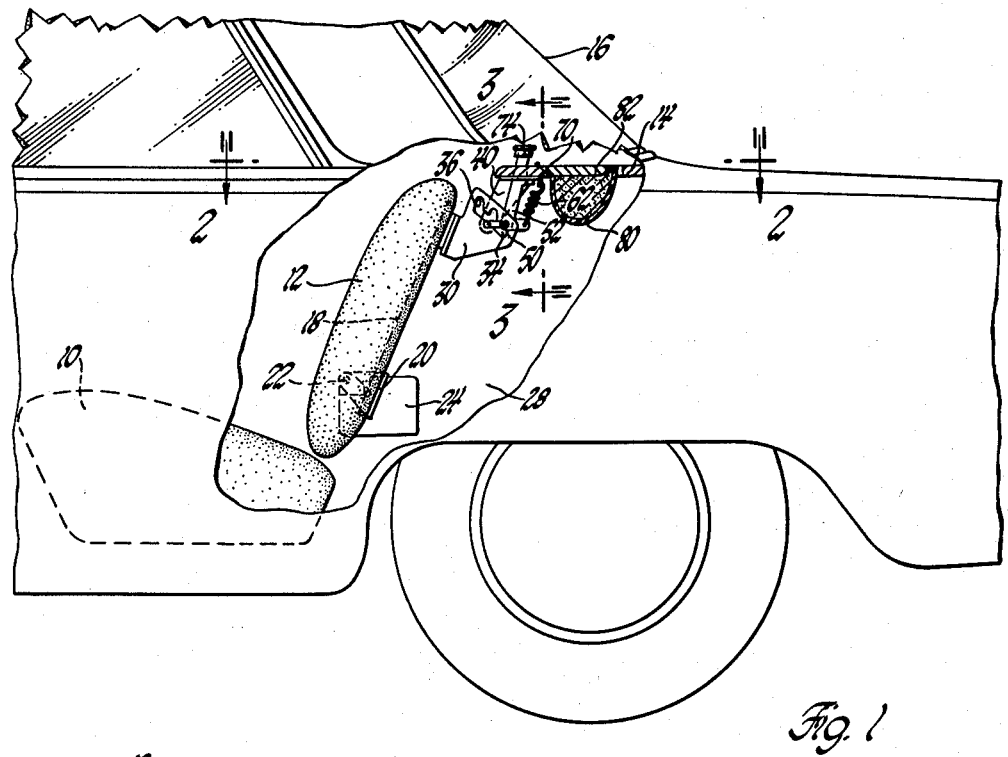

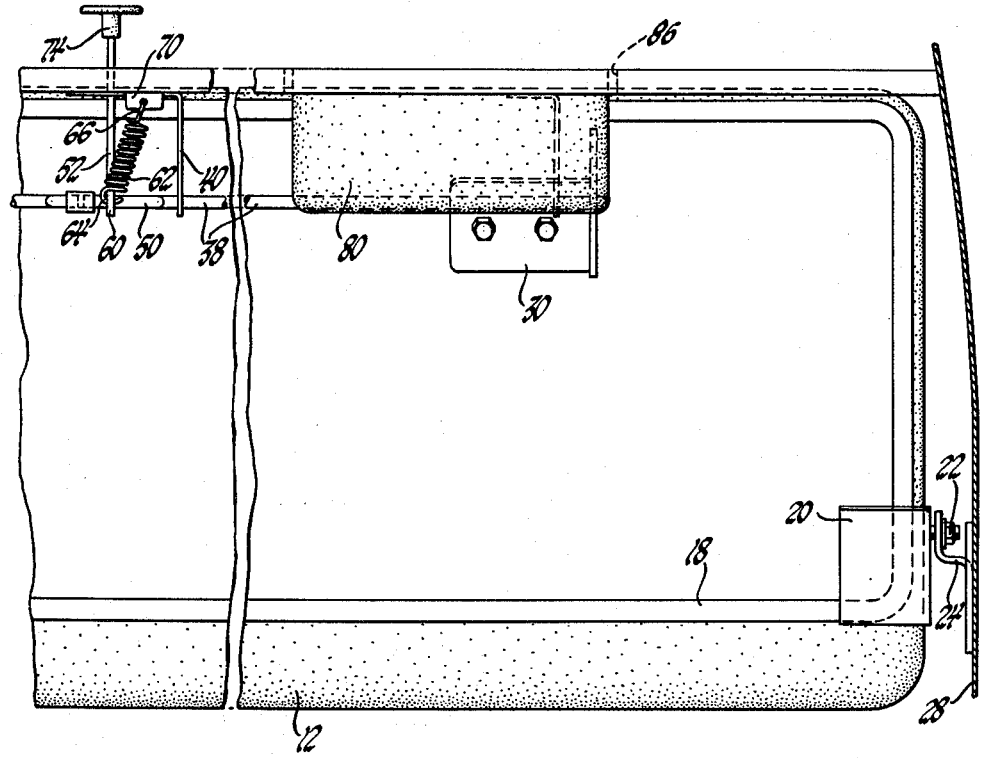
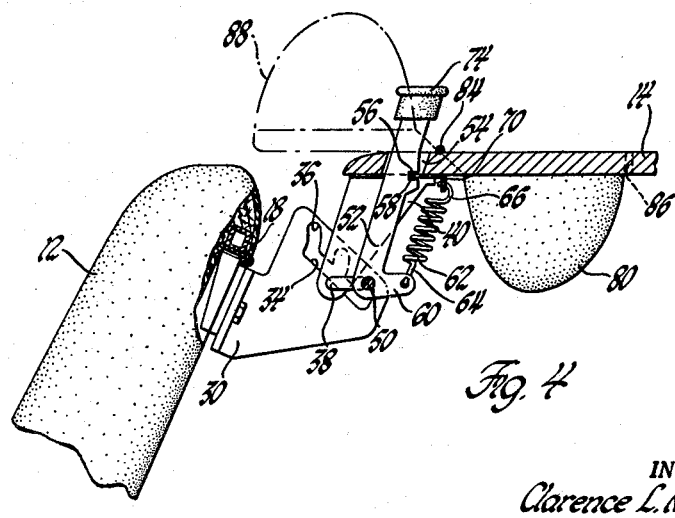

This invention relates to vehicle seat apparatus and more particularly to a reclining rear seat and associated head rest.

The principal object of the present invention is to provide a new and improved reclining rear seat for an automobile and an associated head rest. A more specific object of the invention is to provide a reclining rear automobile seat having a simplified latch mechanism which provides for reclining adjustment thereof. Another specific object of the present invention is to provide individual head rests for rear seat passengers which may be moved from a head rest position to a stowed out-of-the-way position. A further object of the present invention is to provide an adjustable reclining automobile rear seat which may be manually operated in a simplified manner by control mechanism which does not interfere with passenger movement on the rear seat or require modifications in conventional rear seat design. Still another object of the present invention is to provide a head rest for a rear seat which may be stowed within the conventional storage shelf extending rearwardly from the rear seat and provide a continuation thereof when in the stowed position.

Other objects and advantages of the present invention will become apparent by reference to the following detailed description of an illustrative embodiment of the present invention wherein reference is made to the accompanying drawing, in which:

FIGURE 1 is a side elevational view, partly in section, of an automobile embodying the present invention;

FIGURE 2 is a partial sectional view taken along the line 2—2 in FIGURE 1;

FIGURE 3 is a partial sectional view taken along the line 3—3 in FIGURE 1; and

FIGURE 4 is a partial sectional view taken along the line 4—4 in FIGURE 2.

Referring now the drawing, a conventional automobile rear seat arrangement comprising a seat cushion 10, a seat back cushion 12 and a storage shelf 14 which extends rearwardly from the upper end of the seat back cushion 12 to the bottom of the rear window 16 as illustrated. Referring now to FIGURE 3, the seat back cushion 12 is mounted on a seat frame 18 in a conventional manner. Since both the right and left-hand sides of the seat back cushion 12 and the apparatus associated therewith are identical, only one side will be described in detail. It is to be understood that similar head rest means and latch means are provided on the other side of the seat.

The seat back frame 18 is pivotally supported, its lower end on each side, by a bracket 20 and a pivot shaft 22. A pivot arm 24, which is securely fastened to the side wall 28 of the vehicle, supports the pivot shaft. In this manner the seat back cushion 12 is pivotally mounted for adjustable inclination relative to the seat cushion 10.

A latch plate 30 is fixedly secured, at each side of the seat back cushion 12, to the seat frame 18 and extends rearwardly therefrom beneath the storage shelf 14. The latch plate 30 is provided with a downwardly and rearwardly inclined slot 34 having a plurality of upwardly and forwardly curved latch notches 36. A latch rod 38 is rotatably supported in spaced brackets 40, 42 which are secured to the lower surface of the storage shelf 14 and extend downwardly therefrom behind the seat cushion 12. Each end of the latch rod 38 is provided with an eccentric or radially offset portion 46 which extends into the latch slot 34 in the latch plate 30. The central portion of the latch rod 38 is provided with an additional eccentric portion 50 which is mounted in the lower end of a control link 52. The control link 52 extends upwardly through, and is slidably mounted, in a slot 54 provided in the storage shelf 14 and an aligned slot in the bracket 40. A locking notch 56 is provided in the control lever 52 and is adapted to abuttingly engage a flange portion 58 of the bracket 40 in the latched position of the seat back. The lower end of the control lever 52 is provided with a rearwardly extending arm portion 60. A spring element 62 is connected, at one end 64, to the rearwardly extending arm portion 60 and, at the other end 66, to a flange 70 of the bracket 40. A handle 74 is provided on the upper end of the control lever 52 to enable a vehicle passenger to move the control rod 52 forwardly in the slot 54 past the flange 58 and then downwardly against the bias of the spring 62 to rotate the eccentric portion 46 of the latch rod 38 into the latch slot 34 to permit rotation of the seat back 12 about the pivot 22. The seat back 12 may be rotated about the pivot 22 to any one of the adjusted positions represented by the locking notches 36.

Head rest means are provided at the right and left sides of the seat for cooperation with the seat back cushion 12 in its various adjusted positions. Each head rest unit comprises a padded portion 80 which is securely mounted on a plate member 82. A conventional hinge element 84 pivotally connects the plate member 82 to the storage shelf 14. A rectangular compartment opening 86 is provided in the storage shelf 14 to receive the cushion 80 and the plate 82. The head rest unit is movable from a stowed position, shown in FIGURE 4, whereat the cushion portion 80 extends downwardly beneath the storage shelf and the support plate 82 forms a substantial continuation thereof, to the dotted position, shown at 88, where the cushion portion 80 extends upwardly and is supported by the plate 82 on top of the storage shelf. The hinge 84 may be provided with a conventional torsion spring means (not shown) which biases and maintains the head rest unit in the stowed position and in the open position 88. A pull tab (not shown) may be attached to the head rest unit to enable a seat occupant to pull it from the stowed position to the open position.

In operation when it is desired to move the rear seat to a reclined position and utilize the head rest, the control knob 74 may be pushed downwardly to depress the control lever 52 against the bias of the spring 62 and move the offset portion 50 of the latch rod 38 from the position shown in FIGURES 1 and 4, in engagement with the rearwardmost latching notch in the latch plate 30, downwardly into alignment with the latch slot 34. At this time, the seat may be rearwardly inclined to any of the forward latching notches 36. When the seat is in the desired inclined position, the control lever 52 may be released so that the spring 62 will pull the offset portion 50 of the latch rod into latching engagement with one of the latched notches 36. Then the head rest unit 80 may be pulled from the stowed position and pivoted upwardly and forwardly about the hinge 84 to the dotted line position shown in FIGURE 4, whereat the seat occupant is provided with a head rest in the inclined positions of the seat back cushion 12. It is to be noted that a head rest cushion unit is provided on each side of the vehicle so that each of a pair of rear seat passages will have head rest means. When the head rest units are not being used they form no obstruction relative to the storage shelf 14. In this manner the storage shelf may be utilized in the conventional manner to store various types of articles. Furthermore, another apparent advantage of the stowed heat rest units is that, when not in use, they can be moved to the stowed position whereat there is no obstruction of the view obtained through the rear view mirror.

Those modifications and alterations in the specific arrangements of the parts and details of construction thereof, which will be obvious to those of ordinary skill in the art, are intended to be included within the scope of the invention as defined by the appended claims, except insofar as limited by the prior art.

The invention claimed is:

1. In combination in a vehicle having a rear seat, rear seat back cushion, and storage shelf extending rearwardly from a position adjacent the top of the rear seat back cushion: a head rest connected to said storage shelf, a head rest storage compartment provided in said storage shelf, said heat rest having a padded head receiving portion and a shelf portion, said heat rest being movable from a stowed position within said storage shelf to a head rest forming position on top of said storage shelf, said shelf portion of said head rest forming a continuation of said storage shelf in said stowed position and supporting said padded head receiving portion op top of said storage shelf in said head rest forming position.

2. The apparatus as defined in claim 1 and wherein hinge means are provided for pivotally connecting said head rest to the front edge of said compartment whereby said head rest is pivotally movable from said stowed position to said head rest forming position.

References Cited in the file of this patent

UNITED STATES PATENTS

| | | |
|---|---|---|
| 1,812,067 | Toncray | June 30, 1931 |
| 2,152,505 | Stuart et al. | Mar. 28, 1939 |
| 2,765,840 | Robert et al. | Oct. 9, 1956 |
| 2,859,797 | Mitchelson | Nov. 11, 1958 |
| 2,865,434 | Grenz | Dec. 23, 1958 |
| 3,008,767 | Fox | Nov. 14, 1961 |
| 3,065,029 | Spound et al. | Nov. 20, 1962 |